United States Patent
Kuhlman

(10) Patent No.: US 9,937,910 B2
(45) Date of Patent: Apr. 10, 2018

(54) BRAKING SYSTEM AND METHOD OF OPERATING THE SAME

(71) Applicant: Robert Bosch GmbH, Stuttgart (DE)

(72) Inventor: Ryan Kuhlman, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 14/939,069

(22) Filed: Nov. 12, 2015

(65) Prior Publication Data
US 2017/0137006 A1    May 18, 2017

(51) Int. Cl.
| | |
|---|---|
| *B60T 8/44* | (2006.01) |
| *B60T 7/04* | (2006.01) |
| *B60T 8/40* | (2006.01) |
| *B60T 13/14* | (2006.01) |
| *B60T 13/66* | (2006.01) |
| *B60T 13/68* | (2006.01) |
| *B60T 13/74* | (2006.01) |

(52) U.S. Cl.
CPC .............. *B60T 8/441* (2013.01); *B60T 7/042* (2013.01); *B60T 8/4081* (2013.01); *B60T 13/146* (2013.01); *B60T 13/662* (2013.01); *B60T 13/686* (2013.01); *B60T 13/745* (2013.01); *B60T 2270/82* (2013.01)

(58) Field of Classification Search
CPC ........ B60T 8/441; B60T 8/4081; B60T 4/062; B60T 13/686; B60T 13/662; B60T 13/745; B60T 13/146; B60T 2270/82
USPC ...................................... 303/114.1
See application file for complete search history.

(56) References Cited

U.S. PATENT DOCUMENTS

| | | | | |
|---|---|---|---|---|
| 4,730,877 A | * | 3/1988 | Seibert .................... | B60T 7/042 188/358 |
| 6,582,030 B2 | | 6/2003 | Harris | |
| 6,588,855 B2 | | 7/2003 | Harris | |
| 6,672,685 B2 | | 1/2004 | Ishimura et al. | |
| 6,824,288 B2 | | 11/2004 | Harris et al. | |
| 6,851,762 B2 | | 2/2005 | Kamiya et al. | |
| 8,342,615 B2 | * | 1/2013 | Drumm ................. | B60T 8/4077 188/152 |
| 8,757,734 B2 | | 6/2014 | Toyohira et al. | |
| 8,851,579 B2 | * | 10/2014 | Ohkubo .................. | B60T 7/042 303/113.2 |
| 8,911,030 B2 | | 12/2014 | Ohnishi et al. | |

(Continued)

FOREIGN PATENT DOCUMENTS

| | | |
|---|---|---|
| WO | 2007042432 A1 | 4/2007 |
| WO | 2009065710 A1 | 5/2009 |

(Continued)

*Primary Examiner* — Xuan Lan Nguyen
(74) *Attorney, Agent, or Firm* — Michael Best & Friedrich LLP

(57) ABSTRACT

A braking system includes a master cylinder including a master cylinder output, at least one wheel cylinder, a shuttle valve including a shuttle, a volume booster distinct from the master cylinder, a first hydraulic fluid path connecting the master cylinder output to the at least one wheel cylinder through the volume booster and the shuttle valve and a second hydraulic fluid path connecting the master cylinder output to the at least one wheel cylinder through the shuttle valve, bypassing the volume booster. Only one of the first hydraulic fluid path or the second hydraulic fluid path is operable at any one time.

18 Claims, 7 Drawing Sheets

(56) References Cited

U.S. PATENT DOCUMENTS

| | | |
|---|---|---|
| 2011/0254360 A1 | 10/2011 | Klimes et al. |
| 2014/0174072 A1 | 6/2014 | Ishizuka |
| 2014/0346852 A1 | 11/2014 | Thrasher |
| 2015/0021981 A1 | 1/2015 | Shimada et al. |
| 2015/0166024 A1 | 6/2015 | Biller |

FOREIGN PATENT DOCUMENTS

| | | |
|---|---|---|
| WO | 2010139569 A1 | 12/2010 |
| WO | 2011076470 A1 | 6/2011 |
| WO | 2015104122 A1 | 7/2015 |

* cited by examiner

BRAKING SYSTEM AND METHOD OF
OPERATING THE SAME

FIELD OF THE INVENTION

The present invention relates to braking systems, and more particularly to brake-by-wire braking systems and methods of operating brake-by-wire braking systems.

BACKGROUND OF THE INVENTION

Traditional brake systems use hydraulic pressure to generate the force necessary to slow down and stop cars and trucks. These systems are operated by a brake pedal that activates a master cylinder. When the master cylinder is activated, it generates hydraulic pressure in the brake lines. That pressure subsequently acts on the wheel cylinders present in each wheel, which either pinch a rotor between brake pads or press brake shoes outwards into a drum.

Modern hydraulic brake systems have increased complexity, but still work on the same general principle. Hydraulic or vacuum brake boosters reduce the amount of force the driver has to apply, and technologies such as anti-lock brakes and fraction control systems are capable of automatically activating or releasing the brakes.

More recent developments have resulted in brake-by-wire systems in which there is not a direct mechanical connection between the brake pedal and the wheel cylinder during normal operation. These systems still include hydraulic systems, but the driver does not directly activate the wheel cylinders by pressing on the brake pedal. Instead, the wheel cylinders are activated by an electric motor or pump that is regulated by a control unit. If normal operation is not possible, a failsafe mode of operation may provide a direct mechanical connection between the brake pedal and the wheel cylinder.

SUMMARY OF THE INVENTION

The present invention provides, in one aspect, a braking system. The braking system includes a master cylinder including a master cylinder output, at least one wheel cylinder, a shuttle valve including a shuttle, a volume booster distinct from the master cylinder, a first hydraulic fluid path connecting the master cylinder output to the at least one wheel cylinder through the volume booster and the shuttle valve, a second hydraulic fluid path connecting the master cylinder output to the at least one wheel cylinder through the shuttle valve, bypassing the volume booster. Only one of the first hydraulic fluid path or the second hydraulic fluid path is operable at any one time.

The present invention provides, in another aspect, a vehicle braking system. The vehicle braking system includes a master cylinder including an output chamber and a fluid reservoir configured to supply fluid to the output chamber, a brake actuator coupled to the master cylinder and operable when actuated to pressurize fluid in the output chamber, at least one wheel cylinder, an electro-mechanical actuator operable in response to actuation of the brake actuator to actuate the at least one wheel cylinder in a decoupled mode in which there is not a direct mechanical connection between the brake pedal and the at least one wheel cylinder, a volume booster distinct from the master cylinder and operable to provide fluid to the at least one wheel cylinder with a volume increase compared to the master cylinder output chamber in a coupled mode in which there is a direct mechanical connection between the brake actuator and the at least one wheel cylinder, and a bypass line selectively opened by a bypass valve to bypass the volume booster. The bypass line is normally closed in the coupled mode, and the bypass valve is operable to open the bypass line in response to a threshold pressure from the volume booster.

The present invention provides, in yet another aspect, a method of operating a braking system. Pressurized fluid is provided along first path between an output chamber of a master cylinder and at least one wheel cylinder through a valve and a volume booster distinct from the master cylinder. Pressurized fluid is provided along a second path between the output chamber and the at least one wheel cylinder through the valve, and bypassing the volume booster. The valve actuates to close the first and open the second path when a threshold pressure at the volume booster is reached.

Other features and aspects of the invention will become apparent by consideration of the following detailed description and accompanying drawings.

Figure 1:
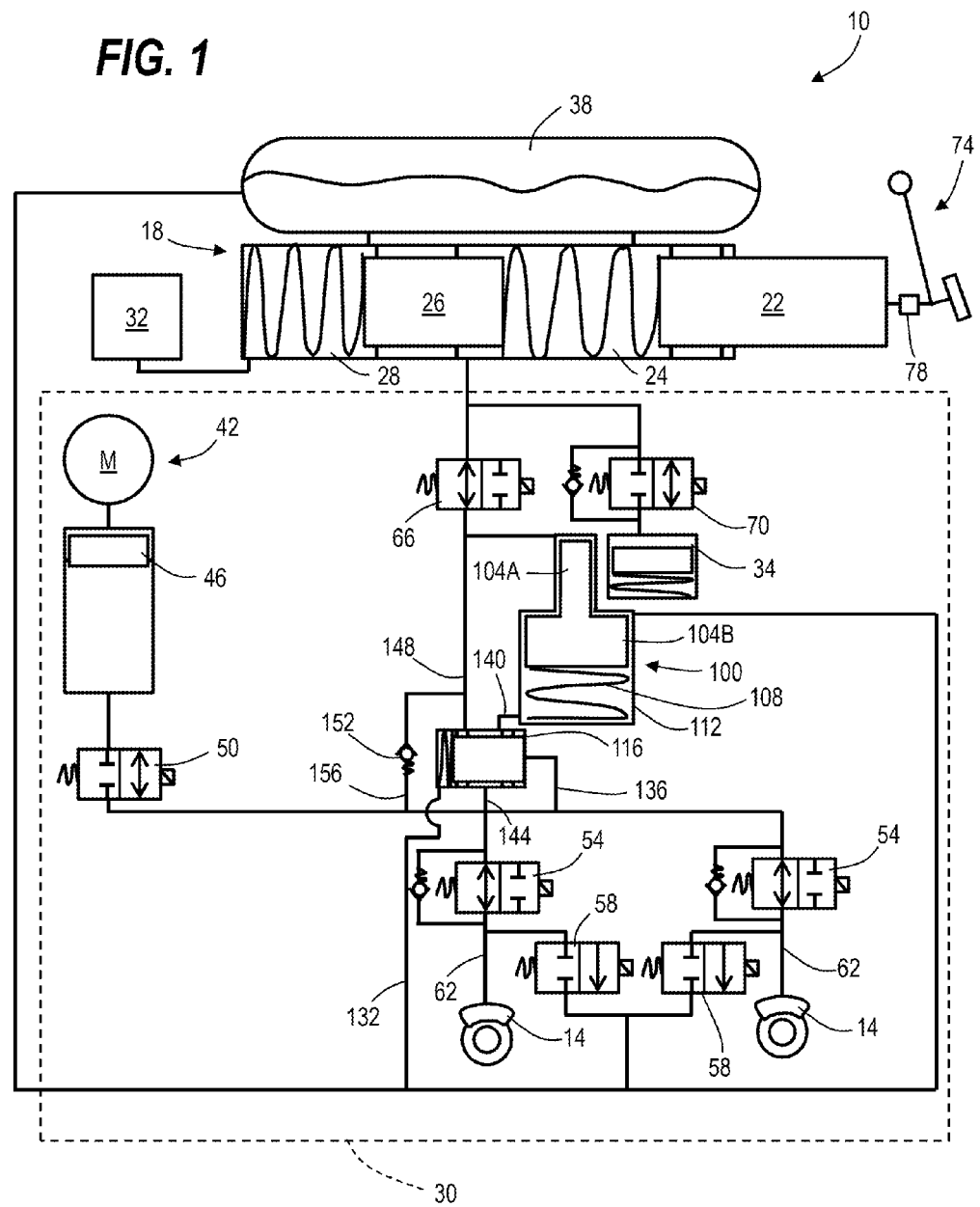
FIG. 1 is a schematic diagram of a vehicle braking system in an un-actuated mode.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A vehicle braking system 10 is shown in FIGS. 1-4 and includes multiple subassemblies capable of providing braking to wheel cylinders 14. The system 10 is an electro-hydraulic brake-by-wire braking system, including both electronic and hydraulic components working in conjunction with one another.

The braking system 10 includes a master cylinder 18 which includes two pistons 22, 26. Each of the pistons 22, 26 is movable between a rest position and an actuated position (e.g., any position excluding the rest position) in response to a user input via a driver actuator 74 such as a foot pedal. The input to the driver actuator 74 is measured by a sensor 78 (e.g., pedal travel sensor, master cylinder output pressure sensor, etc.). The pistons 22, 26 of the master cylinder 18 operate brake circuits 30, 32, each associated with a number of wheel cylinders 14. For example, a vehicle with four total wheel cylinders 14 may include two brake circuits 30, 32, each brake circuit 30, 32 controlling two wheel cylinders 14. For clarity, a second brake circuit 32 is not shown with the same level of detail as the first brake circuit 30. The second brake circuit 32 connects the master cylinder 18 to two additional wheel cylinders not shown in FIG. 1. The second brake circuit 32 is identical to the first brake circuit 30 shown in FIG. 1, though may not include a pedal feel simulator 34. In some constructions, the braking system 10 may only include a single brake circuit.

The master cylinder 18 further includes a fluid reservoir 38 and two distinct variable volume output chambers 24, 28. The output chambers 24, 28 contain hydraulic fluid (e.g., brake fluid) and are associated with the two circuits 30, 32, respectively. The first output chamber 24 is delimited by the walls of the master cylinder 18, the first piston 22, and the second piston 26. The first output chamber 24 is movable relative to the walls of the master cylinder 18 as the pistons 22, 26 move. The second output chamber 28 is delimited by the walls of the master cylinder 18 and the second piston 26. The size of the second output chamber 24 is variable as the second piston 26 moves. As the pistons 22, 26 move, they selectively block or allow communication between the output chambers 24, 28 and the circuits 30, 32 or the fluid reservoir 38.

The fluid reservoir 38 is provided in selective fluid communication with the variable volume output chambers 24, 28 when the pistons 22, 26 are in the rest position. When in an actuated position, the first output chamber 24 is in fluid communication with the first brake circuit 30 and the second output chamber 28 is in fluid communication with the second brake circuit 32. The fluid reservoir 38 maintains a quantity of hydraulic fluid at a first pressure. The reservoir pressure may be ambient pressure or at least a pressure less than the pressure required to active the wheel cylinders 14. Hydraulic fluid returns to the reservoir 38 after the completion of a braking event.

In a first mode of operation (i.e., decoupled brake-by-wire operation), the increased fluid pressure generated at the master cylinder 18 by actuation of the driver actuator 74 is not transmitted to the wheel cylinders 14. Instead, an electro-mechanical actuator 42 (e.g., a motor, a pump) is capable of providing increased pressure to the wheel cylinders 14. As shown in FIG. 1, the actuator 42 includes a motor M. The motor M is configured to move a motor-driven piston 46 between a rest position and an actuated position. The rest position of the motor-driven piston 46 corresponds to the rest position of the pistons 22, 26 of the master cylinder 18 and the actuated position of the motor-driven piston 46 corresponds to the actuated position of the pistons 22, 26 of the master cylinder 18. As previously mentioned, the actuated position of the pistons 22, 26 may be any non-rest position of the pistons 22, 26. This includes a total range of piston travel between a minimum amount of travel and a maximum amount of travel including any values therebetween. The actuated position of the motor-driven piston 46 also includes a total range of piston travel between a minimum amount of travel and a maximum amount of travel including any values therebetween. When the corresponding piston 22, 26 (i.e., corresponding to the appropriate brake circuit 30, 32) moves a percentage of the total travel, the motor-driven piston 46 moves in a predetermined ratio or by a corresponding amount so that the driver's demanded braking is replicated artificially.

A valve 50 is provided between the actuator 42 and the wheel cylinders 14. The valve 50 is configured to selectively connect or disconnect actuator 42 from the wheel cylinders 14. Corresponding inlet and outlet valves 54, 58 associated with each wheel cylinder 14 are provided in each wheel cylinder line 62 of each wheel cylinder 14. An inlet valve 54 selectively permits or blocks communication through the wheel cylinder line 62 to the wheel cylinder 14. An outlet valve 58 selectively permits or blocks flow from the wheel cylinder line 62 to the fluid reservoir 38.

Figure 7:
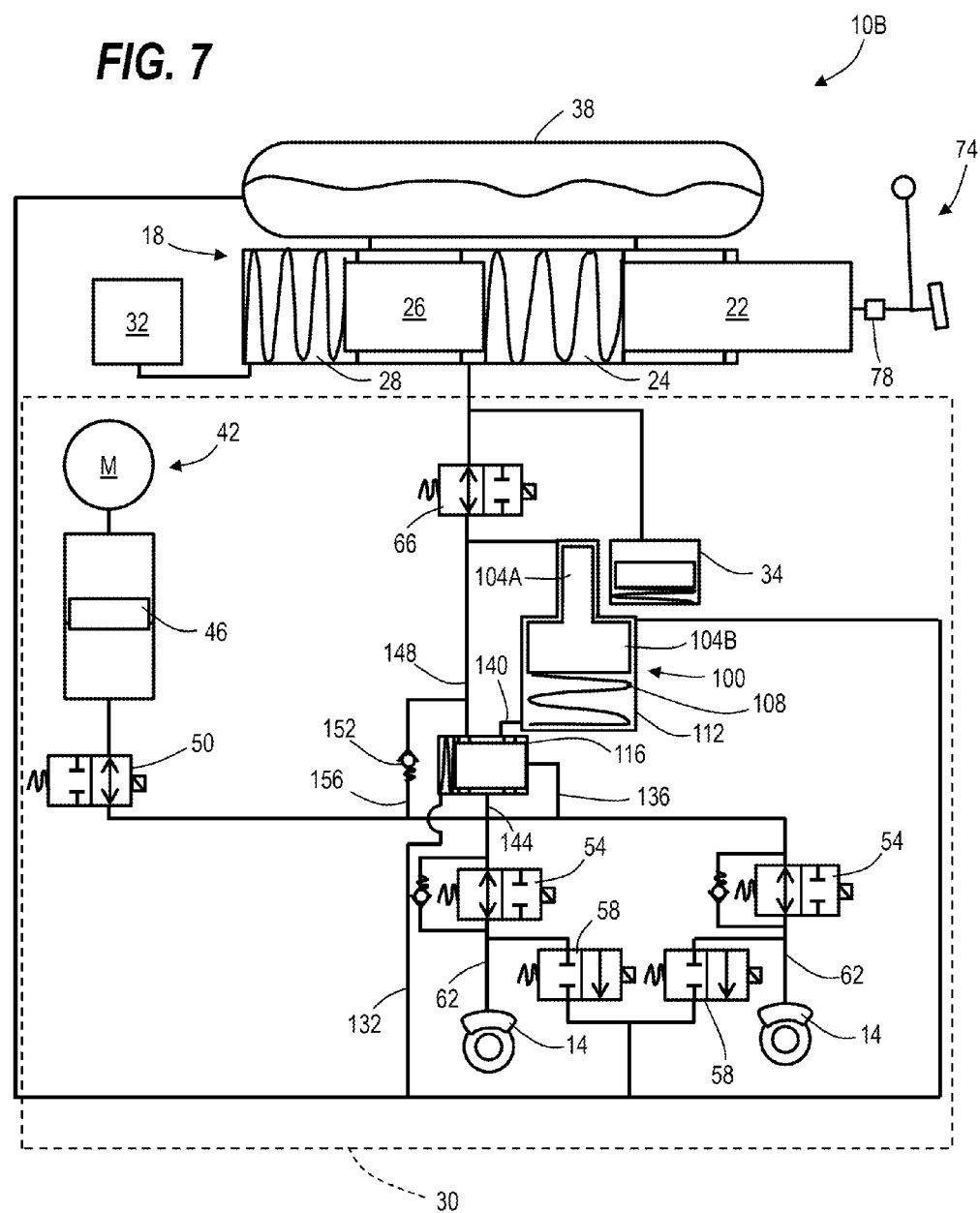
FIG. 7 is a schematic diagram of a vehicle braking system without a simulator valve.

The braking system 10 is also operable in a coupled mode, such as a failsafe mode of operation. In coupled operation (i.e., hydraulic or mechanical communication between the master cylinder 18 and the wheel cylinders 14), fluid pressure generated at the output chambers 24, 28 is transmitted to the wheel cylinders 14. A pair of valves 66, 70 are located directly downstream of the master cylinder 18, between the master cylinder 18 and the wheel cylinders 14. The main switching valve 66, normally open but actuated closed for the decoupled mode, selectively provides a fluid path between the master cylinder output 24 and the wheel cylinders 14. The simulator valve 70, normally closed but actuated open for the decoupled mode, selectively provides a fluid path between the master cylinder output 24 and the pedal feel simulator 34. As shown in FIG. 7, the simulator valve 70 (FIGS. 2-4) may be removed, thereby providing communication between the master cylinder 18 and the pedal feel simulator 34 at all times (i.e., in both coupled and decoupled modes). Alternatively, the valves 66, 70 may be combined into a single valve configured to selectively switch the fluid path from the master cylinder output 24 between the wheel cylinders 14 and the pedal feel simulator 34.

Figure 3:
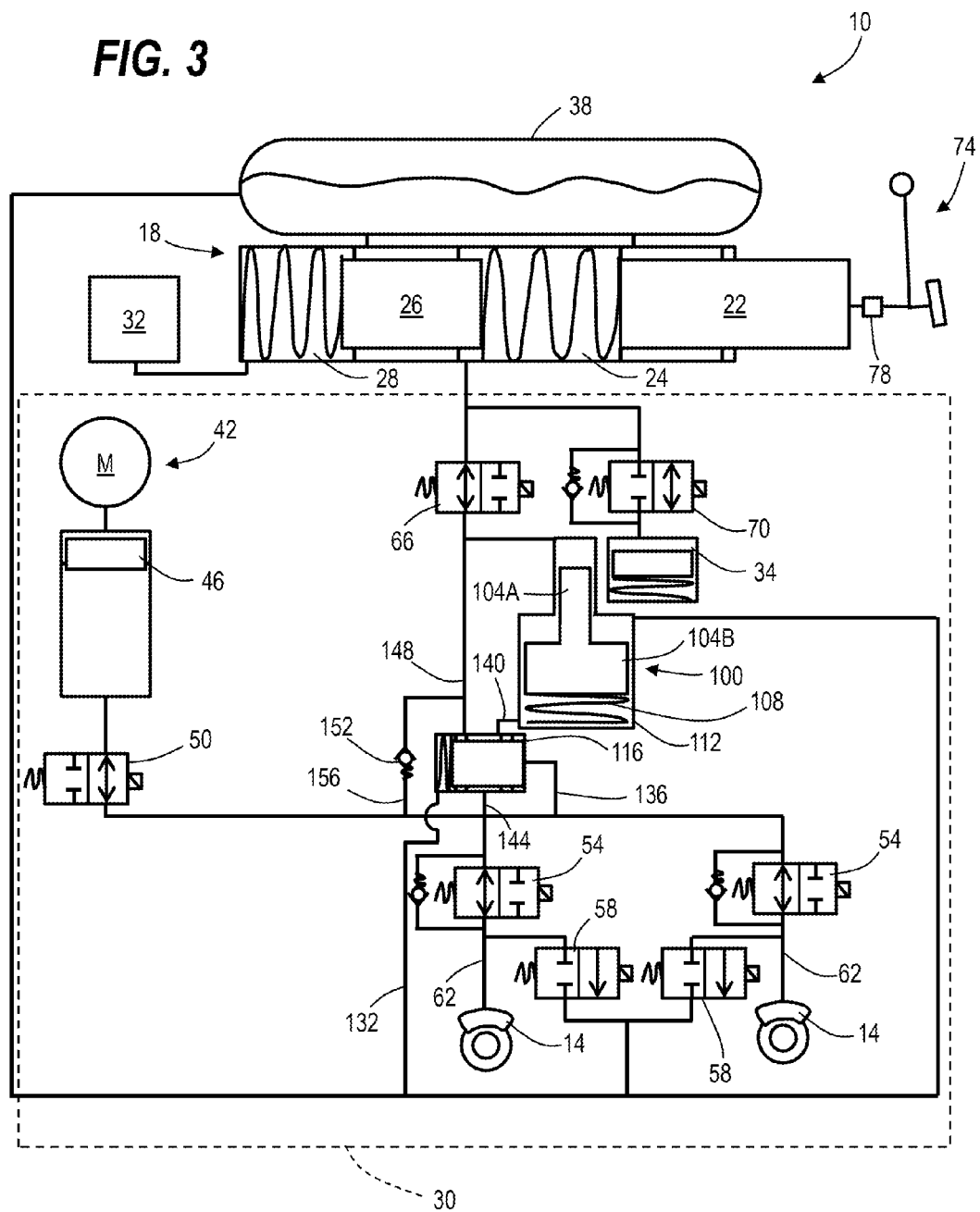
FIG. 3 is a schematic diagram of the vehicle braking system in a first coupled braking mode.
Figure 4:
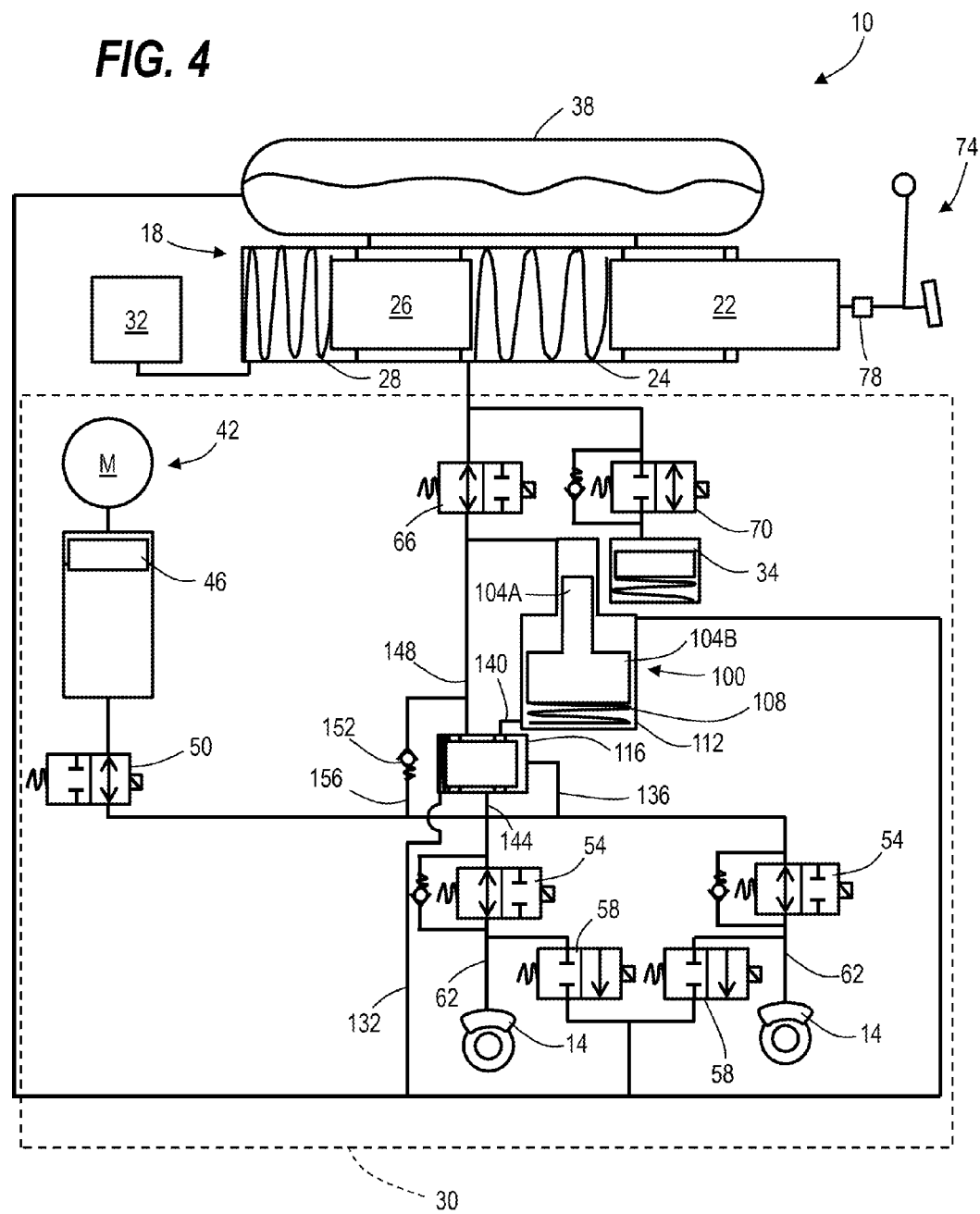
FIG. 4 is a schematic diagram of the vehicle braking system in a second coupled braking mode.
Figure 8:
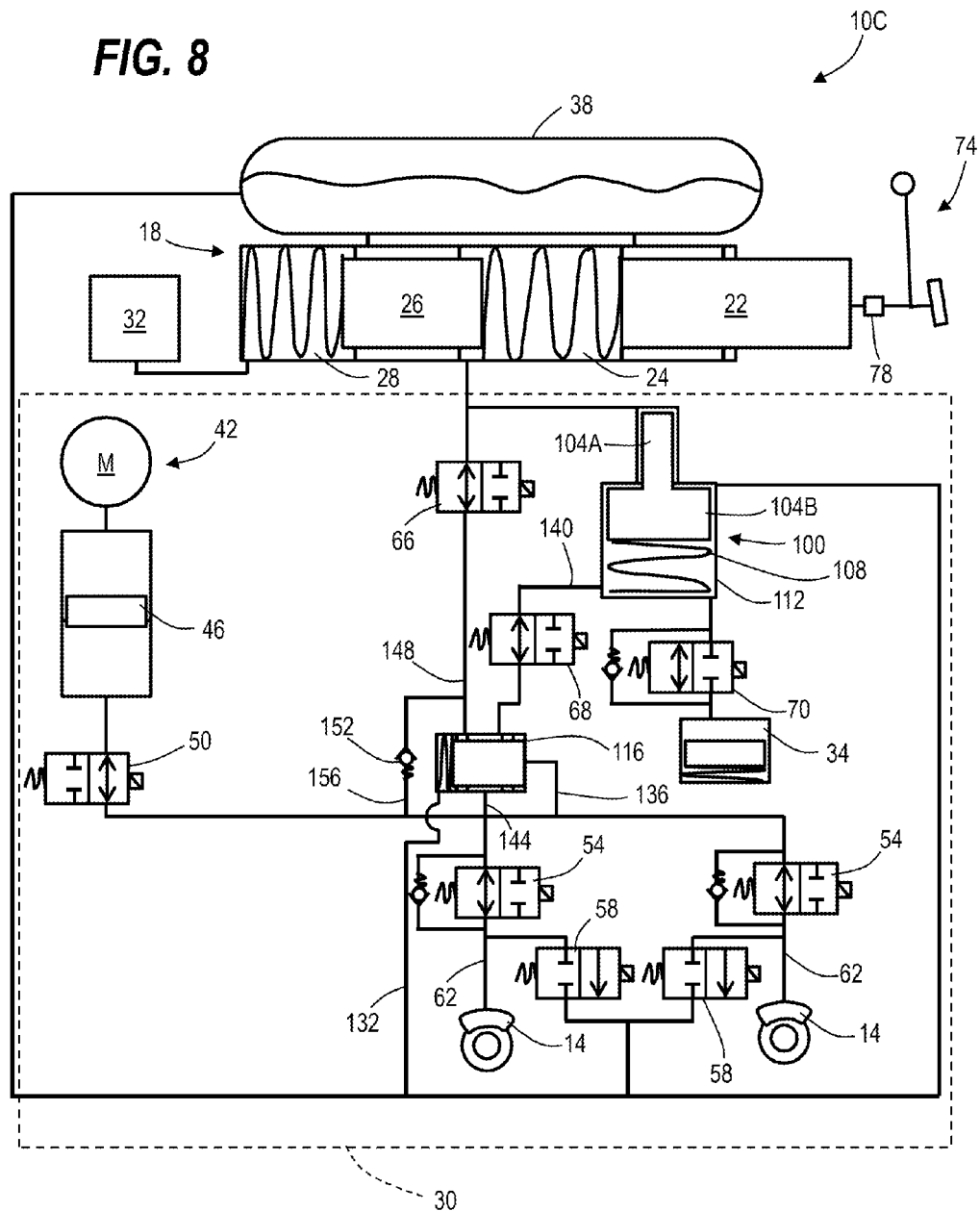
FIG. 8 is a schematic diagram of a braking system with an alternative placement of the pedal feel simulator.

A volume booster 100 including a step piston 104 is located within the brake circuit 30 downstream of the main switching valve 66. The step piston 104 has a variable cross-section such that an inlet end 104A of the step piston 104 (i.e., on the master cylinder side) has a smaller cross-sectional area than an outlet end 104B of the step piston 104 (i.e., on the wheel cylinder side). The step piston 104 is located within a fluid chamber 112 sized to follow the contours of the step piston 104 and further sized to accommodate movement of the step piston 104 relative to the fluid chamber 112. The step piston 104 is biased by a biasing member 108 such that, when not actuated by the master cylinder 18, the inlet end 104A abuts a wall of the fluid chamber 112. When the step piston 104 is actuated by pressure from the master cylinder 18, the biasing member 108 compresses. Near the inlet end 104A of the step piston 100, the fluid chamber 112 is in communication with the master cylinder output 24 through the main switching valve 66. Near the transition from the inlet end 104A to the outlet end 104B, the fluid chamber 112 is in communication with the fluid reservoir 38. As shown in FIG. 8, the volume booster 100 may be located between the pedal feel simulator 34 and the master cylinder 18 such that the volume booster 100 is utilized in both the coupled and the decoupled modes. In the decoupled mode, the simulator valve 70 is open and the pedal feel simulator 34 communicates with the master cylinder 18 via the fluid chamber 112 of the volume booster 100. In the coupled mode, the simulator valve 70 is closed and a booster valve 68 is open to provide the fluid chamber 112, beyond the outlet end 104B of the step piston 104, in communication with a third channel 140. As shown in FIG. 3, the fluid chamber 112 is in communication with the third channel, without necessitating a booster valve. The third channel 140 connects the volume booster 100 to a shuttle valve 116 that operates as a volume boost shutoff valve. The valve 116 can be a simple mechanical valve with no electronic control capabilities, biased towards one position and movable by fluid pressure.

Figure 5:
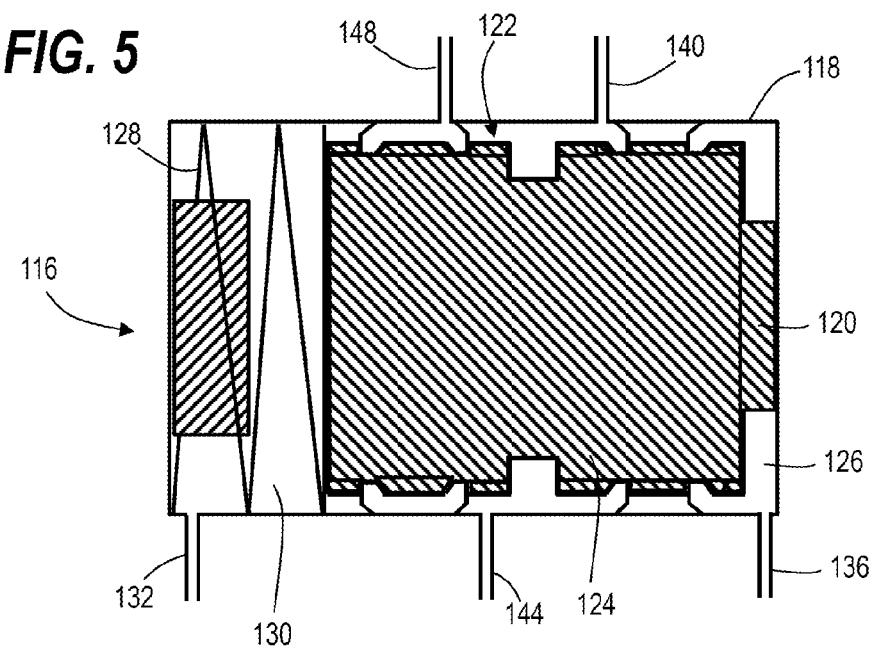
FIG. 5 is a schematic representation of a valve of the vehicle braking system in a first position.
Figure 6:
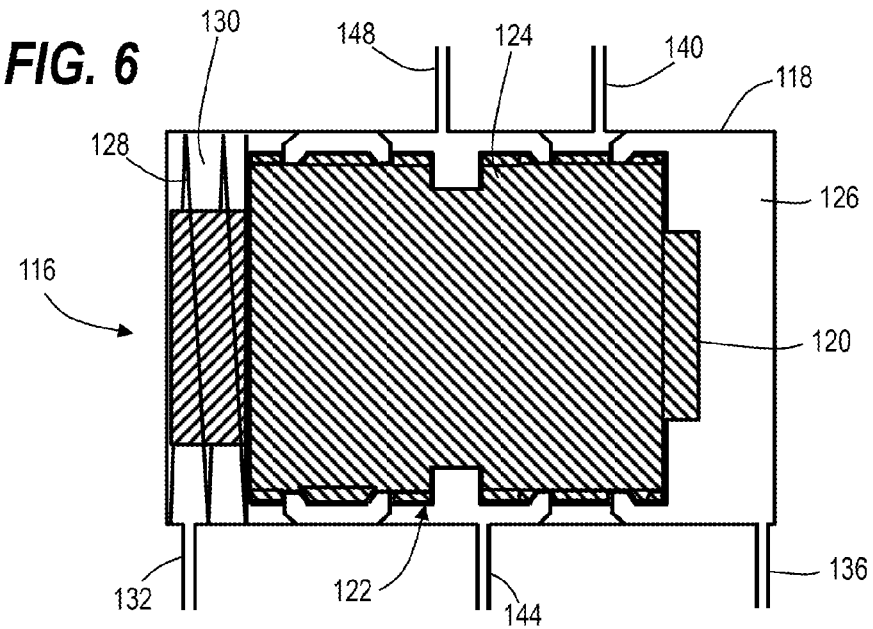
FIG. 6 is a schematic representation of the valve of the vehicle braking system in a second position.

As shown in greater detail in FIGS. 5-6, the shuttle valve 116 includes a valve element or shuttle 122 movable between a first position (FIG. 5) and a second position (FIG. 6) relative to a housing 118 of the shuttle valve 116. A first portion 120 of the shuttle 122 has a generally circular cross-sectional area transverse to the direction of travel. Similarly, a second portion 124 has a circular cross-sectional area transverse to the direction of travel, the cross-sectional area of the second portion 124 greater than the cross-sectional area of the first portion 120. In the first position, the first portion 120 of the shuttle 122 abuts a first end of the housing 118 creating a first fluid chamber 126 between the first end of the housing 118 and the second portion 124 of the shuttle 122. The shuttle 122 is biased towards the first position by a spring 128 located in a second fluid chamber 130 delimited by the second position 124 of the shuttle 122 and a second end of the housing 118, opposite the first end. As explained in more detail below, when the force applied to the shuttle 122 by the spring 128 is overcome by the pressure of hydraulic fluid from the volume booster 100 (i.e., the pressure within the wheel cylinder lines 62), the shuttle valve 116 transitions from the first position (FIG. 5) to the second position (FIG. 6). When the force applied to the shuttle 122 by the hydraulic fluid is overcome by the pressure applied by the spring 128, the shuttle 122 transitions from the second position (FIG. 6) to the first position (FIG. 5).

The shuttle valve 116 is in fluid communication with a number of elements of the brake circuit 30. A first channel 132 connects the fluid reservoir 38 to the second fluid chamber 130 of the shuttle valve 116. The fluid reservoir 38 is always in communication with the second fluid chamber 130 regardless of the position of the shuttle 122. Likewise, a second channel 136 connects the wheel cylinder lines 62 and wheel cylinders 14 to the first fluid chamber 126 regardless of the position of the shuttle 122.

When the shuttle 122 is in the first position (FIG. 5), a third channel 140 connects the volume booster 100 to a fourth channel 144 through the housing 118 of the shuttle valve 116. The fourth channel 144 is in fluid communication with the second channel 136, and is configured to direct fluid from the shuttle valve 116 towards the wheel cylinder lines 62 and the wheel cylinders 14. When the shuttle 122 is in the second position (FIG. 6), the third channel 140 is blocked by the shuttle 122 to prohibit fluid flow from the third channel 140 past the shuttle valve 116. A fifth channel 148 or volume booster bypass line is in selective communication with the master cylinder output 24 via the main switching valve 66. When the shuttle 122 is in the first position, the fifth channel 148 is blocked by the shuttle 122 to prohibit fluid flow from the fifth channel 148 past the shuttle valve 116. When the shuttle 122 is in the second position, the fifth channel 148 connects the master cylinder output 24 to the fourth channel 144 and the wheel cylinders 14 through the shuttle valve 116.

A one-way check valve 152 is provided in a bypass channel 156 to circumvent the shuttle valve 116. The check valve 152 prohibits flow from the wheel cylinder lines 62 from returning towards the main switching valve 66 and the master cylinder 18, but allows fluid to flow from the valve 66 to the wheel cylinders 14 if fluid pressure within the fifth channel 148 is greater than the combination of the fluid pressure within the wheel cylinder lines 62 and the spring force provided by the check valve 152. The pressure required in the fifth channel 148 to utilize the bypass valve 152 may be at or below the pressure required to move the shuttle 122 from the first position to the second position.

The vehicle braking system 10 of FIGS. 1-4 is configured to operate in three different braking modes. A first braking mode, or decoupled braking mode, which may be a primary mode of operation, involves a user input to the driver actuator 74. The driver actuator 74 provides a force upon the first piston 22, which in turn, through increased fluid pressure within the first output chamber 24, provides a force upon the second piston 26. The sensor 78 within the output chambers 24, 28 or, as shown, in direct communication with the driver actuator 74 relays the pressure change within the output chamber 24, 28 or the travel of the pistons 22, 26 or actuator 74 to a controller (not shown). As shown by the transition from FIG. 1 to FIG. 2, the controller provides instructions to the electro-mechanical actuator 42 to move the motor-driven piston 46 an amount corresponding to the driver's request via the actuator 74. With the valve 50 and the inlet valves 54 in the open position and the outlet valves 58 in the closed position, the increased fluid pressure from the motor-driven piston 46 is provided to the wheel cylinders 14 to actuate the wheel cylinders 14 an amount proportional to the user input. If the user input is increased or decreased in magnitude, the new pressure or piston position is relayed to the controller and the electro-mechanical actuator 42 responds accordingly.

Figure 2:
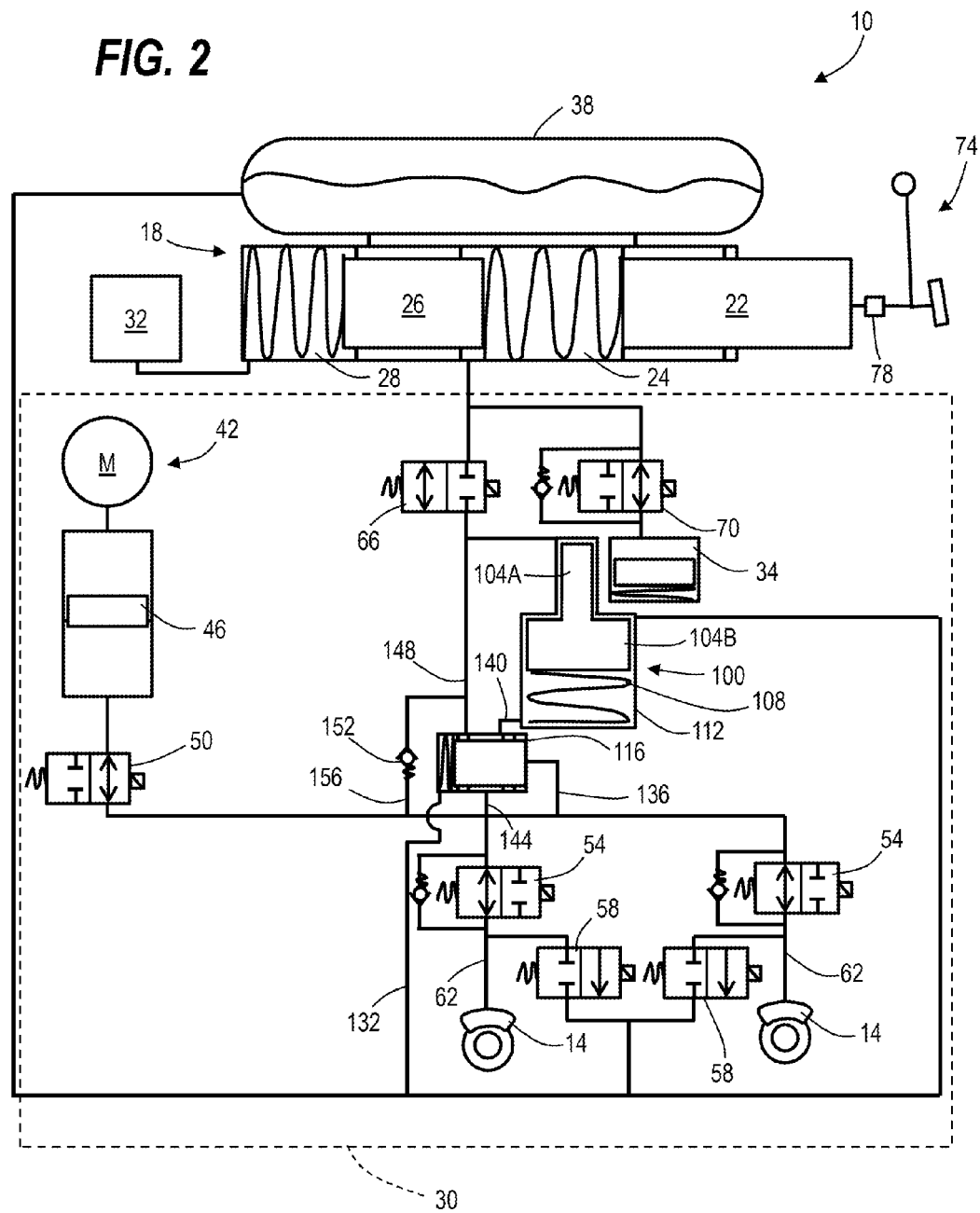
FIG. 2 is a schematic diagram of the vehicle braking system in a decoupled braking mode.

As shown in FIG. 2, in the decoupled mode, the main switching valve 66 is actuated and disconnects the first output chamber 24 of the master cylinder 18 from the wheel cylinders 14, and the simulator valve 70 is actuated and connects the first output chamber 24 of the master cylinder 18 to the pedal feel simulator 34. As shown in the braking system 10B of FIG. 7, the simulator valve 70 may be omitted thereby placing the pedal feel simulator 34 in constant communication with the master cylinder 18. Further, as shown in the braking system 10C of FIG. 8, the simulator valve may be located downstream of the volume booster 100. In any of FIG. 2, 7, or 8, the pedal feel simulator 34 provides feedback to the driver proportional to the user input, a feeling most drivers are accustomed to receiving in non-brake-by-wire braking systems. Therefore, in the decoupled mode, a hydraulic fluid path connects the master cylinder output chamber 24 to the pedal feel simulator 34.

As shown in FIG. 3, a second braking mode, or a first coupled mode, may be utilized in the event that the first braking mode is incapable of providing adequate braking pressure to the wheel cylinders 14. Specifically, in the second braking mode, the electro-mechanical actuator 42 and the motor-driven pump 46 are not actuated. The second mode may be utilized if a failure occurs in, for example, the electro-mechanical actuator 42, the motor-driven piston 46, the sensor 78, or the controller. The main switching valve 66 is not actuated and connects the first output chamber 24 of the master cylinder 18 to the wheel cylinders 14, and the simulator valve 70 is not actuated and maintains separation between the first output chamber 24 of the master cylinder 18 and the pedal feel simulator 34.

In the second mode, the shuttle 122 is in the first position such that the first portion 120 of the shuttle 122 abuts the housing 118. Further, the fifth channel 148, which connects the main switching valve 66 to the shuttle valve 116, is blocked by the shuttle 122 and therefore, does not communicate with the wheel cylinders 14. Instead, fluid from the output 24 is directed to the inlet end 104A of the volume-booster 100. Since the cross-sectional area of the inlet end 104A is less than the cross-sectional area of the outlet end 104B, the volume of fluid applied to the inlet end 104A is multiplied at the third channel 140 based on the ratio of the two cross-sections. The increased fluid volume from the volume booster 100 is transferred from the third channel 140, through the shuttle 122 to the fourth channel 144. With the inlet valves 54 in the open position and the outlet valves 58 in the closed position, the increased fluid pressure from the fourth channel 144 is provided to the wheel cylinders 14 to actuate the wheel cylinders 14 an amount proportional to the user input. Therefore, in the second mode, the hydraulic fluid path connects the master cylinder output chamber 24 to the wheel cylinders 14 through the volume booster 100 and the shuttle valve 116. The increased volume from the volume booster 100 elicits a quicker response to initiate the braking action at the wheel cylinders 14.

As the step piston 104 has a limited amount of travel, the pressure provided to the wheel cylinders 14 through the shuttle valve 116 is also limited. Since the fourth channel 144 is in fluid communication with the second channel 136 at all times, the increase in fluid pressure provided to the wheel cylinders 14 is additionally provided to the first fluid chamber 126 adjacent the first portion 120 of the shuttle 122. When the pressure within the first fluid chamber 126 overcomes the force of the spring 128 (i.e., reaches a preset cutoff or threshold pressure), the shuttle 122 moves from the first position (FIG. 5) to the second position (FIG. 6).

With the first portion 120 of the shuttle 122 abutting the housing 118 in the first position, the fluid within the first fluid chamber 126 pushes on the exposed ring-shaped portion of the second portion 124 against the spring 128. However, once the shuttle 122 begins to move (i.e., the first portion 120 lifts away from the housing 118) the fluid within the first fluid chamber 126 is applied along both the first portion 120 and the second portion 124 causing the shuttle 122 to expediently collapse the spring 128. This design prevents a slow transition of the shuttle 122 from the first position to the second position, and further permits the shuttle 122 to remain in the second position regardless of small fluctuations in fluid pressure within the first fluid chamber 126.

When the shuttle 122 transitions to the second position at the threshold pressure, the vehicle braking system 10 is in a third braking mode, or second coupled mode. In the third braking mode, the third channel 140 from the volume-booster 100 is disconnected from the fourth channel 144, blocked by the shuttle 122. Instead, the master cylinder output chamber 24 directly communicates with the wheel cylinders 14 through the main switching valve 66, the shuttle valve 116 through the fifth channel 148, fourth channel 144, and the wheel cylinder lines 62. The direct communication between the master cylinder output chamber 24 and the wheel cylinders 14 indicates that the volume-booster 100 is bypassed in the third mode. Further, the plurality of valves 54, 66, 116 direct the flow to the wheel cylinders 14, without volume boosting once the pressure exceeds the threshold. Therefore, the third mode may be used once the travel of the step piston 104 reaches a predetermined limit and the shuttle valve transitions from the first position to the second position. The predetermined limit is less than total available travel by a factory of safety. In comparison to volume boosting in the second mode, an input to the driver actuator 74 provides less variation in braking force at the wheel cylinders 14, allowing the driver greater modulation control. Additionally, the input provides a greater mechanical or hydro-mechanical ratio, thereby increasing the pressure generated from a given force at the driver actuator 74. In the third mode, the hydraulic fluid path connects the master cylinder output chamber 24 to the wheel cylinders 14 through the shuttle valve 116 but bypasses the volume booster 100.

Therefore, in the first mode, the pressure and volume of the hydraulic fluid provided to the wheel cylinders 14, though dependent on the travel of the master cylinder 18, are not sourced from the pressure or volume provided by the master cylinder 18. Instead, the pressure and volume are provided by the output of the electromechanical actuator 42. In the second mode, the volumetric displacement in the master cylinder output chamber 24 is amplified before applied to the wheel cylinders 14 via the volume booster 100. In the third mode, the volumetric displacement in the master cylinder output chamber 24 is not amplified, but rather directly transmitted to the wheel cylinders 14.

When the user input to the driver actuator 74 is removed in any of the three modes, flow reverses from the wheel cylinders 14 back to the master cylinder outlet 24 to reset the master cylinder 18 as the pressure within the wheel cylinder lines 62 returns to reservoir pressure.

Various features of the invention are set forth in the following claims.

What is claimed is:

1. A vehicle braking system comprising:
    a master cylinder including a master cylinder output;
    at least one wheel cylinder;
    a shuttle valve including a shuttle;
    a volume booster distinct from the master cylinder;
    an electro-mechanical actuator operable to actuate the at least one wheel cylinder;
    a first hydraulic fluid path connecting the master cylinder output to the at least one wheel cylinder through the volume booster and the shuttle valve; and
    a second hydraulic fluid path connecting the master cylinder output to the at least one wheel cylinder through the shuttle valve, bypassing the volume booster,
    wherein only one of the first hydraulic fluid path or the second hydraulic fluid path is operable at any one time, and
    wherein the electro-mechanical actuator does not provide fluid to the volume booster.

2. The braking system of claim 1, the volume booster comprising:
    a step piston with an inlet end of a first cross-sectional area and an outlet end fixed to the inlet end with a second cross-sectional area greater than the first cross-sectional area,
    wherein the outlet end is downstream of the inlet end such that, in the first hydraulic fluid path, a fluid from the master cylinder is configured to communicate with the shuttle valve via the inlet end of the step piston.

3. The braking system of claim 1, wherein the shuttle is operable to transition between a first position and a second position in response to a pressure at the volume booster at or above a threshold pressure.

4. The vehicle braking system of claim 1, further comprising a third hydraulic fluid path connecting the master cylinder output to a pedal feel simulator, wherein only one of the first hydraulic fluid path, the second hydraulic fluid path, or the third hydraulic fluid path is operable at any one time.

5. The braking system of claim 4, wherein, when the third hydraulic fluid path is operable, the electro-mechanical actuator is in communication with the at least one wheel cylinder.

6. The braking system of claim 4, further comprising a decoupled mode in which the third hydraulic fluid path connects the master cylinder output to the pedal feel simulator; and a coupled mode in which one of the first hydraulic fluid path or the second hydraulic fluid path connects the master cylinder output to the at least one wheel cylinder.

7. The braking system of claim 6, further comprising a driver actuator, wherein, in both the decoupled mode and the coupled mode, the braking system is operable in response to a user input to the driver actuator.

8. The braking system of claim 6, wherein the coupled mode is operable to switch from the first hydraulic fluid path to the second hydraulic fluid path in response to a threshold pressure from the volume booster.

9. A vehicle braking system comprising:
   a master cylinder including an output chamber and a fluid reservoir configured to supply fluid to the output chamber;
   a brake actuator coupled to the master cylinder and operable when actuated to pressurize fluid in the output chamber;
   at least one wheel cylinder;
   an electro-mechanical actuator operable in response to actuation of the brake actuator to actuate the at least one wheel cylinder in a decoupled mode in which there is not a direct mechanical connection between the brake pedal and the at least one wheel cylinder;
   a volume booster distinct from the master cylinder and operable to provide fluid to the at least one wheel cylinder with a volume increase compared to the master cylinder output chamber in a coupled mode in which the electro-mechanical actuator is inactive and there is a direct mechanical connection between the brake actuator and the at least one wheel cylinder; and
   a bypass line selectively opened by a bypass valve to bypass the volume booster,
   wherein the bypass line is normally closed in the coupled mode, and the bypass valve is operable to open the bypass line in response to a threshold pressure from the volume booster.

10. The vehicle braking system of claim 9, wherein the electro-mechanical actuator is not operable in the coupled mode.

11. The vehicle braking system of claim 9, wherein the bypass valve is configured to transition between a first position and a second position in the coupled mode, wherein, in the first position, the valve provides a fluid path from the volume booster to the at least one wheel cylinder and blocks the bypass line, and wherein, in the second position, the valve blocks fluid communication between the volume booster and the at least one wheel cylinder and provides a fluid path from the output chamber to the at least one wheel cylinder via the bypass line.

12. The vehicle braking system of claim 11, wherein the bypass valve is a shuttle valve including a shuttle biased to the first position.

13. The vehicle braking system of claim 12, wherein the shuttle includes:
    a first portion with a first cross-sectional area that, in the first position, abuts a housing of the shuttle valve, and
    a second portion, fixed to the first portion, with a second cross-sectional area, greater than the first cross-sectional area.

14. The vehicle braking system of claim 9, wherein the volume booster includes a step piston with an inlet end and an outlet end, the outlet end having a cross-sectional area greater than a cross-sectional area of the inlet end.

15. A method of operating a braking system, the method comprising:
    providing pressurized fluid along a first path between an output chamber of a master cylinder and at least one wheel cylinder through a valve and a volume booster distinct from the master cylinder,
    providing pressurized fluid along a second path between the output chamber and the at least one wheel cylinder through the valve, and bypassing the volume booster, and
    providing pressurized fluid along an additional path from an electro-mechanical actuator and to the at least one wheel cylinder, bypassing the valve and the volume booster,
    wherein the valve actuates to close the first path and open the second path when a threshold pressure at the volume booster is reached.

16. The method of claim 15, wherein the valve is a shuttle valve including a shuttle, and wherein the shuttle moves from a first position to a second position to close the first path and open the second path when a threshold pressure in the first path is reached.

17. The method of claim 15, further comprising:
    providing a third path, the third path located between the output chamber of a master cylinder and a pedal feel simulator with a simulator valve therebetween; and
    closing the third path via the simulator valve when utilizing either of the first path and the second path.

18. The method of claim 15, wherein providing pressurized fluid along either the first path or the second path occurs in a coupled mode, the method further comprising operating the braking system in a decoupled mode by closing the first path and the second path and opening a third path, the third path providing pressurized fluid from the output chamber of the master cylinder to a pedal feel simulator.

* * * * *